United States Patent
Drenguis et al.

(10) Patent No.: US 11,078,063 B2
(45) Date of Patent: Aug. 3, 2021

(54) METHOD AND DEVICE FOR CLEANING AND/OR DISINFECTING A DEVICE FOR PRODUCING CONTAINERS FILLED WITH A LIQUID FILLING MATERIAL

(75) Inventors: Alfred Drenguis, Börnsen (DE); Dieter Klatt, Hamburg (DE)

(73) Assignees: KHS GmbH, Dortmund (DE); KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 14/118,841

(22) PCT Filed: Apr. 17, 2012

(86) PCT No.: PCT/EP2012/001644
§ 371 (c)(1),
(2), (4) Date: Feb. 24, 2014

(87) PCT Pub. No.: WO2012/156013
PCT Pub. Date: Nov. 22, 2012

(65) Prior Publication Data
US 2014/0196415 A1    Jul. 17, 2014

(30) Foreign Application Priority Data

May 19, 2011   (DE) ...................... 10 2011 102 090.3

(51) Int. Cl.
| B67C 3/00 | (2006.01) |
| B65B 3/02 | (2006.01) |
| B08B 9/027 | (2006.01) |
| B08B 9/00 | (2006.01) |
(Continued)

(52) U.S. Cl.
CPC ............... *B67C 3/001* (2013.01); *B08B 9/00* (2013.01); *B08B 9/027* (2013.01); *B65B 3/022* (2013.01); *B29C 49/4252* (2013.01); *B29C 49/4273* (2013.01); *B29C 49/46* (2013.01); *B29C 2049/4626* (2013.01);
(Continued)

(58) Field of Classification Search
None
See application file for complete search history.

(56) References Cited

U.S. PATENT DOCUMENTS

| 4,076,071 A | 2/1978 | Rosenkranz et al. |
| 4,623,516 A | 11/1986 | Weiler et al. |
| 5,346,386 A | 9/1994 | Albrecht et al. |
(Continued)

FOREIGN PATENT DOCUMENTS

| DE | 2352926 | 4/1975 |
| DE | 4212583 | 10/1993 |
(Continued)

*Primary Examiner* — Mikhail Kornakov
*Assistant Examiner* — Pradhuman Parihar
(74) *Attorney, Agent, or Firm* — Rankin, Hill & Clark LLP (57) ABSTRACT

A device for the integrated production and filling of containers and a method for cleaning and/or disinfecting at least the mold of at least one molding and filling station of the device. During a cleaning and/or disinfecting operation of the device, at least the inside of the mold is cleaned and/or disinfected with at least one cleaning and/or disinfecting agent by at least one cleaning element. During the cleaning and/or disinfecting operation, the at least one mold is opened and closed at least once, preferably many times and/or the plunger is moved at least once, preferably many times, between its initial position and end position.

12 Claims, 9 Drawing Sheets

(51) Int. Cl.
*B29C 49/42* (2006.01)
*B29C 49/46* (2006.01)

(52) U.S. Cl.
CPC ............. *B29C 2049/4664* (2013.01); *B29C 2049/4679* (2013.01); *B29C 2049/4694* (2013.01)

(56) References Cited

U.S. PATENT DOCUMENTS

| | | | |
|---|---|---|---|
| 5,648,026 A | 7/1997 | Weiss | |
| 8,535,037 B2 | 9/2013 | Voth | |
| 8,580,166 B2 | 11/2013 | Hirdina | |
| 2001/0009702 A1* | 7/2001 | Murphy | B29C 33/04 428/35.7 |
| 2009/0218733 A1* | 9/2009 | Andison | B29C 49/46 264/525 |
| 2010/0127417 A1* | 5/2010 | Liebmann | B29C 44/588 264/39 |
| 2010/0303946 A1* | 12/2010 | Voth | 425/226 |
| 2011/0037187 A1* | 2/2011 | Winzinger et al. | 264/39 |
| 2011/0037188 A1* | 2/2011 | Hirdina | B08B 9/00 264/39 |
| 2011/0133369 A1 | 6/2011 | Martini et al. | |
| 2011/0265083 A1 | 11/2011 | Chauvin et al. | |

FOREIGN PATENT DOCUMENTS

| | | |
|---|---|---|
| DE | 4340291 | 6/1995 |
| DE | 102008038141 A | 11/2003 |
| DE | 20023423 Y | 3/2004 |
| DE | 102009036922 A | 7/2004 |
| DE | 102009036920 A | 2/2011 |
| EP | 2255949 Y | 12/2010 |
| EP | 2279850 Y | 2/2011 |
| WO | 2007120807 A2 | 10/2007 |
| WO | 2010003871 | 1/2010 |
| WO | 2010003873 | 6/2011 |

* cited by examiner

METHOD AND DEVICE FOR CLEANING AND/OR DISINFECTING A DEVICE FOR PRODUCING CONTAINERS FILLED WITH A LIQUID FILLING MATERIAL

The present application is a 371 of International application PCT/EP2012/001644, filed Apr. 17, 2012, which claims priority of DE 10 2011 102 090.3, filed May 19, 2011, the priority of these applications is hereby claimed and these applications are incorporated herein by reference.

BACKGROUND OF THE INVENTION

The invention relates to a method for cleaning and/or disinfecting a device for producing containers filled with a liquid filling material.

Known is the production of containers by blow molding from preforms made of a thermoplastic material, for example from preforms made of PET (polyethylene terephthalate), wherein the preforms are supplied to different treatment stations within a blowing machine (DE-OS 43 40 291). Typically, a blowing machine has a heating apparatus for tempering or preheating (thermally conditioning) the preforms and a blowing device with at least one blowing station in whose area the respective, previously tempered preform is expanded biaxially or multiaxially to form a container. The expansion is effected using a pressurised gas (compressed air) as a pressure medium which is introduced, at a molding pressure, into the preform to be expanded. The process technology for such an expansion of the preform is explained in DE-OS 43 40 291.

The basic design of the blowing station is described in DE-OS 42 12 583. Options for tempering the preforms are explained in DE-OS 23 52 926.

According to a typical further processing operation, the containers produced by blow molding are supplied to a subsequent filling device where they are filled with the intended product or filling material. Thus, a separate blowing machine and a separate filling machine are used. In this context, it is also known to consolidate the separate blowing machine and the separate filling machine to form a machine block, i.e. to form a blocked blowing-filling device wherein, furthermore, the blow molding and the filling are performed on separate machine components, and sequentially.

Furthermore, it has already been proposed to produce containers, especially in the form of bottles, from thermally conditioned or preheated preforms and to simultaneously fill them with a liquid filling material which is supplied as a hydraulic pressure medium for expanding the preforms or for shaping the container at a molding and filling pressure so that, simultaneously with the filling, the respective preform is formed to produce the container. A particular problem of such a method is that it is essential to avoid contamination of the respective molding and filling station or of the mold that constitutes this station, said mold, similar to a blow mold of a blow molding machine for producing containers, being made from thermally conditioned performs by blowing with a pressurised gas. Especially in case of full or partial carbonisation of the filling material, there is the particular risk of contaminating the respective molding and filling station by filling material losses, especially when lowering the internal pressure of the container, i.e. when relieving the container of the rather high molding and filling pressure down to ambient pressure. Such filling material losses are especially due to massive foaming during relief, so that the simultaneous molding and filling of containers using preforms and using the filling material as a pressure medium (hydraulic shaping technology), especially for products containing $CO_2$, could previously not be used.

At the end of the respective molding and filling process, filling material inevitably remains at or in the molding and filling elements. This filling material, for example, drips off at least partially and/or distributes due to the air movement in the inside of the molds of the molding and filling stations, or, in case of machine faults or breakdowns possibly even in greater quantities, is flung into the inside of the molds of the molding and filling elements or into the molding and filling area of the device and thus also contaminates, in particular, critical surfaces, i.e. those surfaces which, during molding and filling, come into contact with the filling material and/or with surfaces of the containers that are close to the filling material and/or touch the filling material so that, by microbial contamination of the surfaces contaminated with the filling material, a microbiological risk occurs to the filling material but also to persons, especially the operating staff.

SUMMARY OF THE INVENTION

The task of the invention is to show a method which precludes a microbiological risk to the filling material and to humans during molding and simultaneous filling of containers.

For example, by regular cleaning and sterilisation or disinfection of the respective molding and filling station, a microbiological risk is precluded or at least minimised, e.g. in that the cleaning removes filling material residues to which microbial contamination could occur and, moreover, all areas, which are close to filling material, of the respective molding and filling station are sterilised or disinfected.

"Product-carrying areas" within the meaning of the present invention are those areas, especially ducts, lines etc. which, during the normal molding and filling operation, carry the filling material to be introduced into the preforms or into the containers being molded.

"Areas close to filling material" within the meaning of the invention are those areas or surfaces of the molding and filling station which come into direct contact with the filling material, especially the areas carrying filling material but also areas or surfaces which come into contact with surfaces, especially with the opening edge and the inner surface of the preforms and of the containers being molded and/or, during the molding and filling process, reach into the preform or into the containers being molded.

"Filling material inflow" within the meaning of the invention means the inflow which, for example, is formed by at least one delivery opening via which the liquid filling material, during the molding and filling process, is introduced into the respective preform or into the container being molded.

The expression "essentially" or "about" means, within the meaning of the invention, deviations from the respective exact value by +/−10%, preferably by +/−5% and/or deviations in the form of changes insignificant to the function.

Further developments, advantages and possible applications of the invention can also be taken from the following description of exemplary embodiments and from the figures. All features described and/or illustrated form the subject-matter of the invention per se or in any combination, independent of their inclusion in the claims or their back-reference. The content of the claims is also made part of the description.

The invention is explained in detail below with reference to the figures using exemplary embodiments, with.

BRIEF DESCRIPTION OF THE DRAWING

DETAILED DESCRIPTION OF THE INVENTION

The device, generally designated 1 in FIGS. 1-6, serves to produce filled containers 2 in the form of bottles (FIG. 4) using preforms 3 made of a thermoplastic material, for example of polyethylene terephthalate (PET), polyethylene (PEE), polyethylene naphthalate (PEN) or polypropylene (PP). The preforms 3, in the known manner, are of a sleeve-like design with an open end forming the subsequent container mouth and with a closed bottom forming the subsequent container bottom and with a flange forming the subsequent mouth flange (see FIG. 5).

The containers 2 filled with a liquid filling material are always produced such that each conditioned perform 3, which is at least preheated and arranged in a closed mold 5 of a molding and filling station 4, is charged with the filling material which is at a high molding and filling pressure and, for example, heated for a hot sterile filling, so that the preform 3, in a molding and filling process, is hydraulically shaped by this filling material into the respective container 2 and the container 2 is filled at the same time. The container 2 thus molded and simultaneously filled is then suitably closed after being relieved of the molding and filling pressure and following removal from the mold 5.

To perform the molding and filling process, the device 1 has, at a rotatably drivable transport element in the form of a rotor 6 rotatably drivable about a vertical machine axis MA, a plurality of molding and filling stations 4 which are provided at an equal radial distance from the machine axis MA and, at equal angle distances, offset about this axis. Each molding and filling station 4 comprises, in addition to its mold 5, a molding and filling element 7 which is arranged, in the embodiment shown, over this mold, said molding and filling element, at least during the respective molding and filling process, reaching into the closed mold 5 with a filling element portion or bearing head 8 and against which the respective preform 3 and the container 2 being molded rest, through support means (not shown) with an open end, pressed into the sealing position. In the embodiment shown, the rotor 6 is designed with a circular cylinder-shaped rotor portion 6.1 concentrically enclosing the machine axis MA and with an upper or lower annular rotor portion 6.2 or 6.3 distanced, like a flange, from the rotor portion 6.1.

Figure 5:
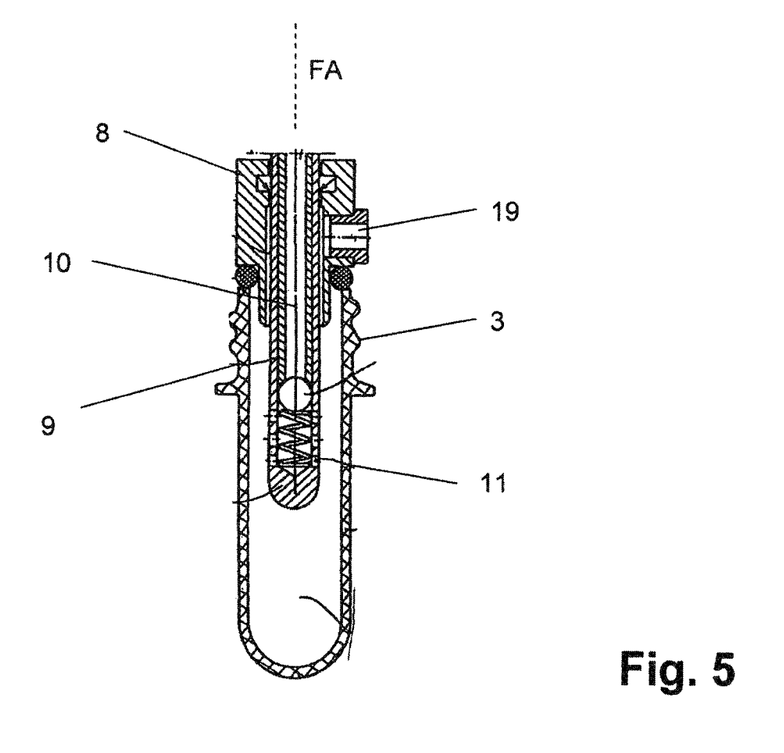
FIG. 5 showing, in simplified individual representation and in section, a preform together with a part, which has a stretch rod or a plunger, of a molding and filling station of the device of FIG. 1.
Figure 6:
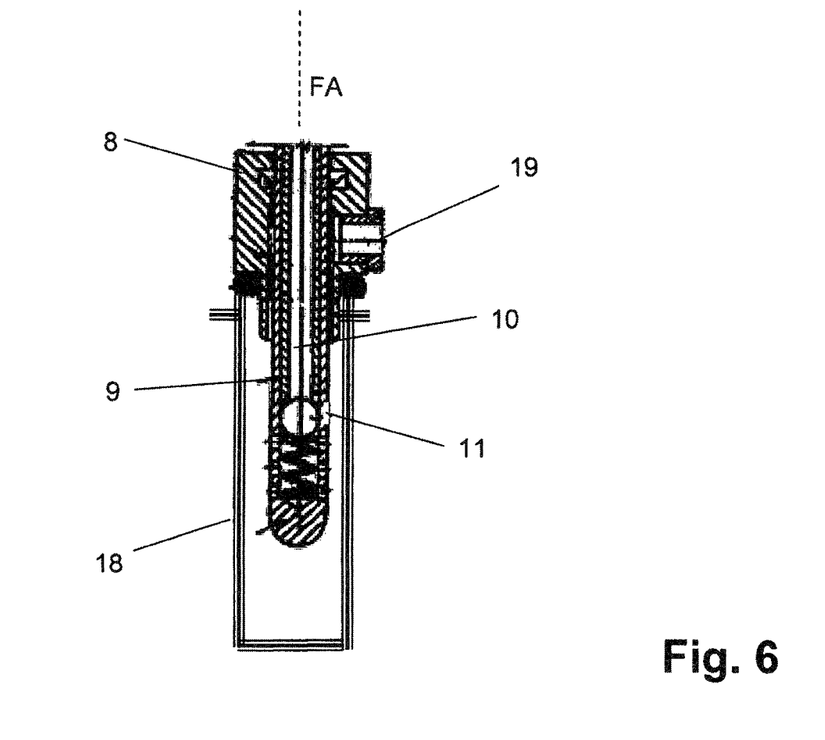
FIG. 6 showing, in a representation like FIG. 5, a rinsing cap together with the part, which has the plunger, of a molding and filling station of the device of FIG. 1.

In the bearing head 8, in the vertical direction, i.e. in the direction of a molding and filling element axis FA, an axially displaceable plunger 9 is provided which, with its lower rounded end in FIG. 5, during the molding and filling process, is initially moved downwards, in a controlled manner, resting against the bottom of the preform 3 concerned and then against the bottom of the container 2 being formed and thus controlling the shaping or stretching of the preform 3 into the respective container 2 in the axis FA. In the embodiment shown, the liquid filling material is also introduced into the preform 3 or into the container 2 being progressively molded via a fluid duct 10 which is formed in the plunger 9 and enters at openings 11 into the area of the lower end of the plunger 9.

At the rotor 6, a ring bowl 12 is provided which, during the molding and filling operation of the device 1, is at least partly filled with the filling material subjected to molding and filling pressure and connected, via lines 13 having control valves 13.1, with the filling elements 7. Underneath the molding and filling stations 4, a ring bowl 14 is provided at the rotor 6, said ring bowl serving, for example in the manner described more detailedly below, as a collection bowl or collection container for collecting liquid cleaning and disinfecting agents during a cleaning and disinfection operation of the device 1.

The preforms 3 are supplied to the individual molding and filling stations 4 or the opened molds 5, in the embodiment shown, via a transport star 15. After molding and filling, the filled containers 2 are removed from the re-opened molds 5 via a transport star 16.

During the respective molding and filling process, filling material inevitably remains in the molding and filling elements 7 and especially in or at their bearing heads 8 and plungers 9 and then drips off, e.g. after removing each filled container 2 so that, due to air movements, internal and/or external contamination of the molds 5 with filling material occurs, especially when, due to machine faults, for example due to damaged or burst containers 2, larger quantities of filling material enter the inside of the mold 5.

To preclude the microbiological risk, emanating from germs forming on filling material residues, to the filling material filled into in the containers 2 and/or also to humans, for example the operating staff of the device 1, regular cleaning and disinfection of all areas and/or functional elements of the device 1, which come into contact with the filling material and/or with areas of the containers 2 which are close to the filling material, are required. This regular cleaning and disinfection is always performed in a multi-stage cleaning and disinfection operation.

Figure 1:
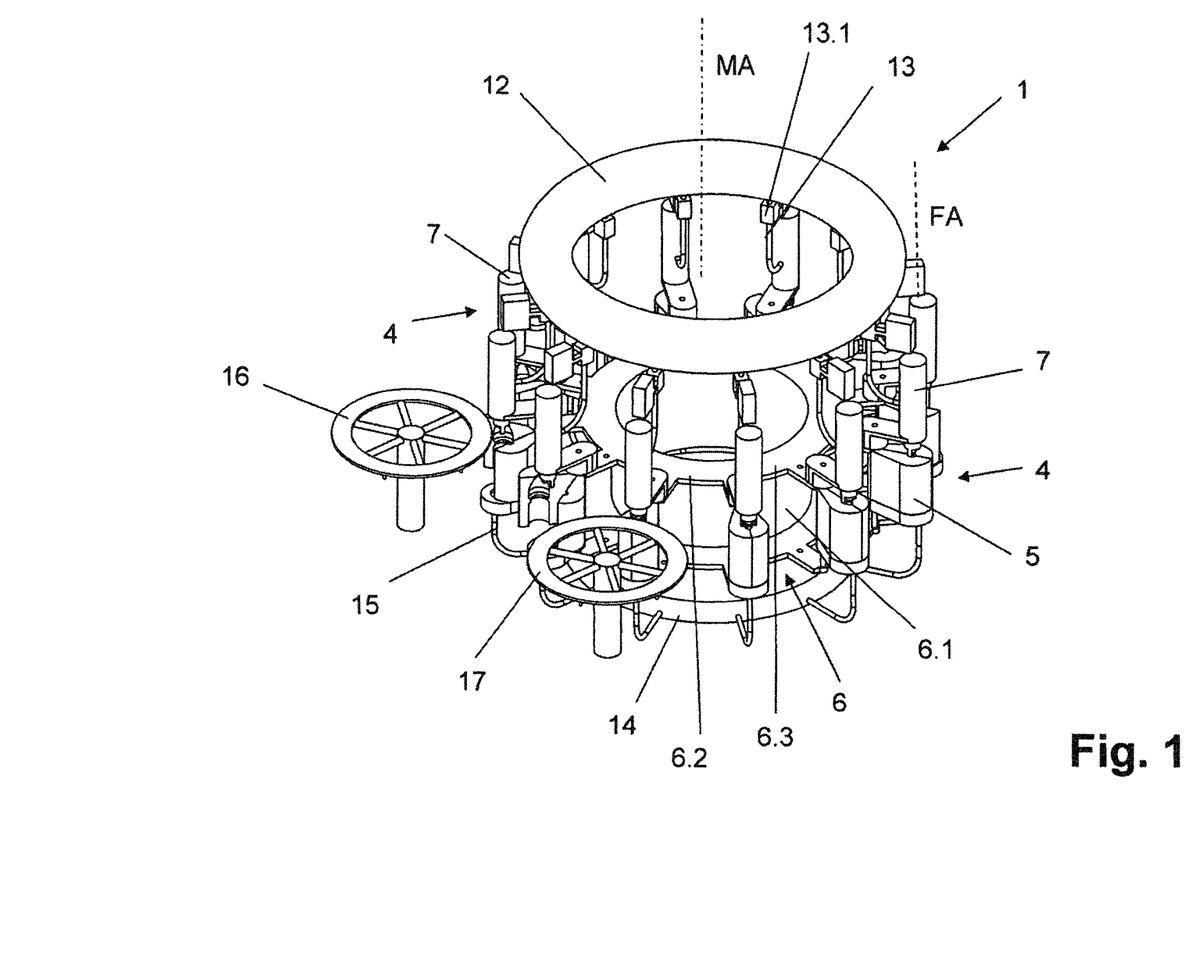
FIG. 1 showing, in simplified perspective representation, a device or machine of rotating design for producing filled containers, for example in the form of bottles, wherein the device is in an operating state for external cleaning or external disinfection of the molding and filling stations.
Figure 2:
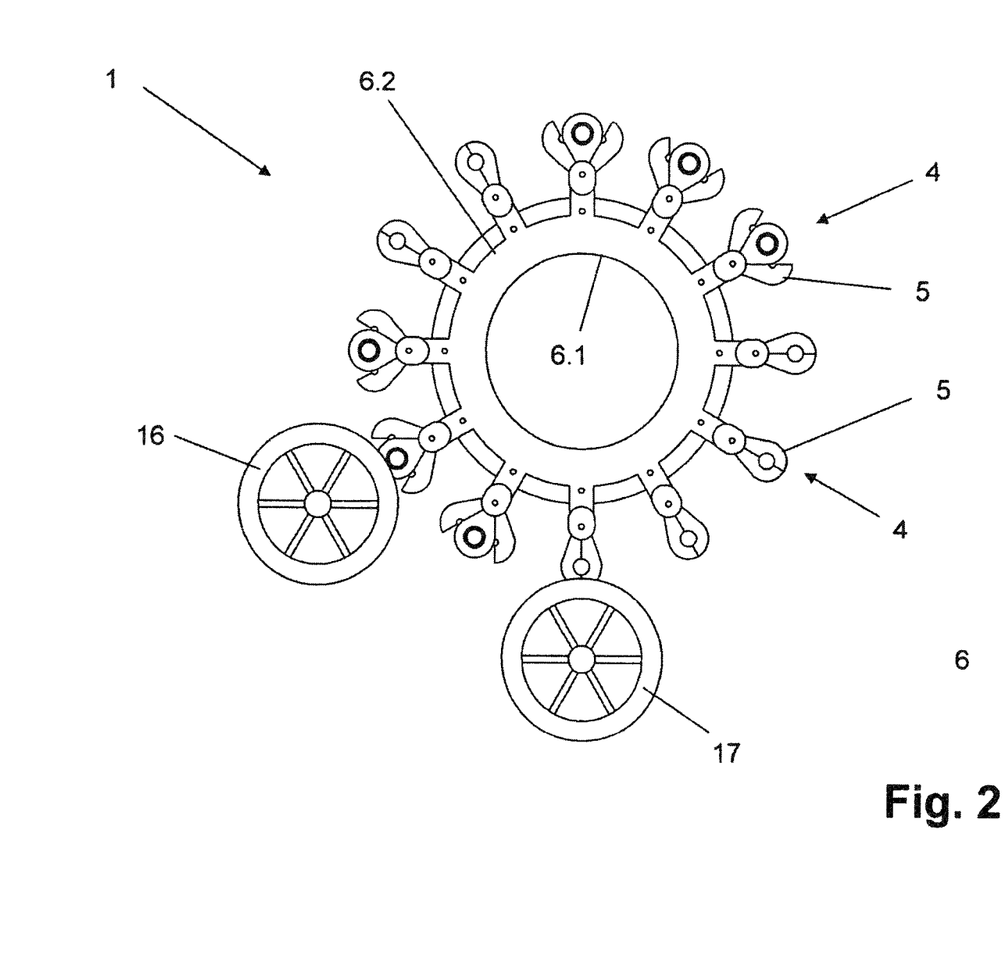
FIG. 2 showing a plan view of the device of FIG. 1.
Figure 3:
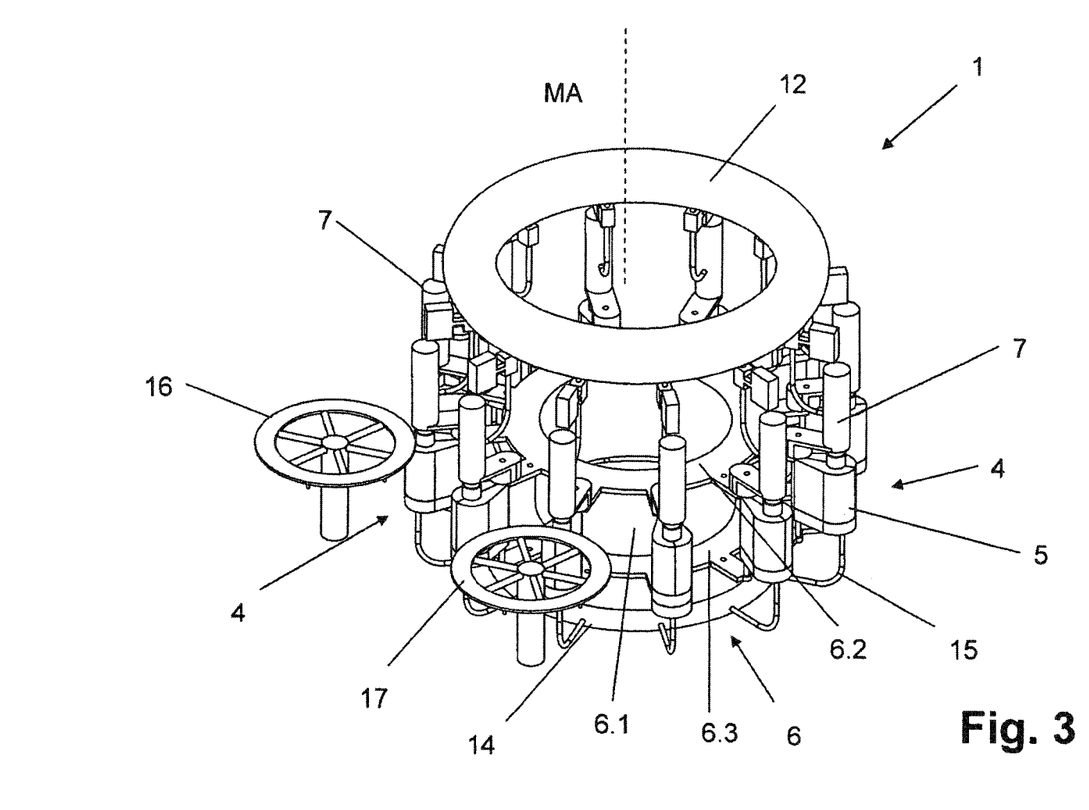
FIG. 3 showing a representation like FIG. 1, wherein the device is in an operating state for internal cleaning or internal disinfection of the molding and filling stations.
Figure 4:
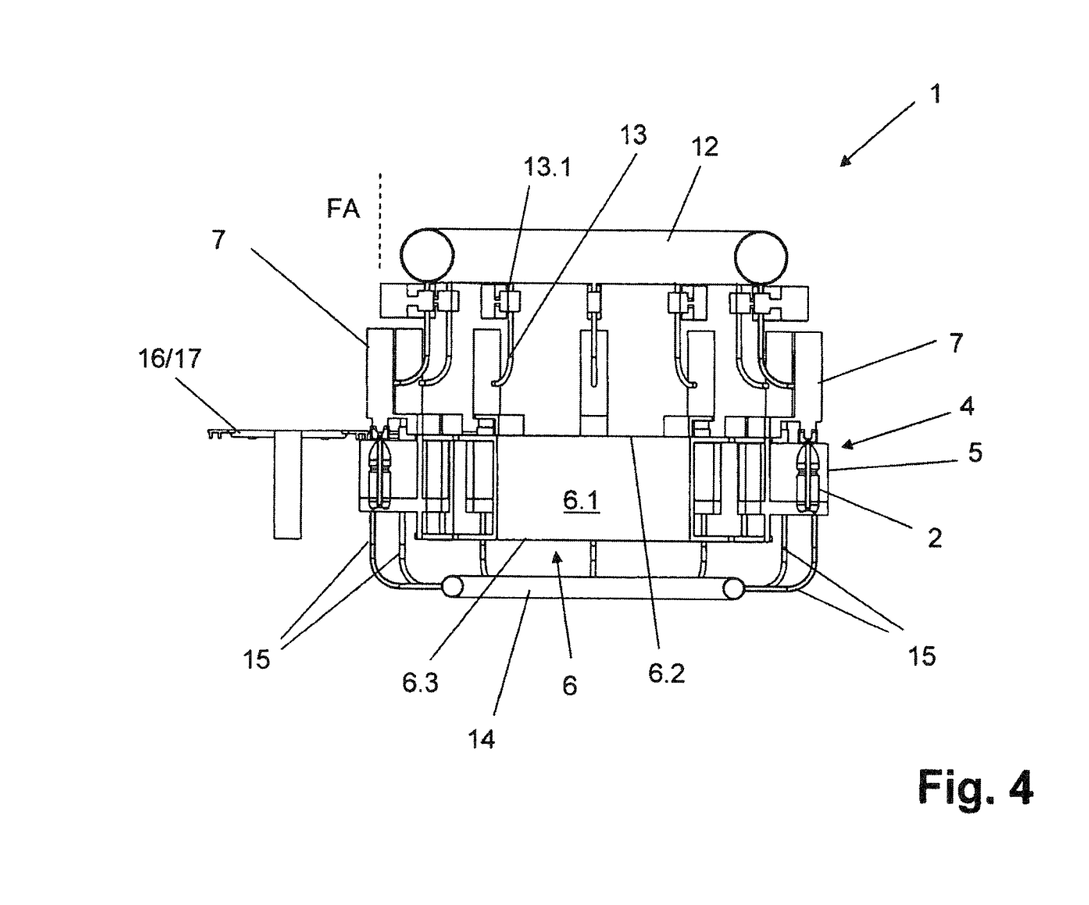
FIG. 4 showing, in schematic representation and in vertical section, the device of FIG. 1 or 3.

During such a cleaning and disinfection operation, with the rotor 6 rotating, external cleaning and then internal cleaning of the molding and filling stations 4 are for example performed, always with at least one suitable liquid and/or foaming cleaning medium, e.g. via external nozzles not shown which, for example, are rotating and/or fixed nozzles and are provided at a machine frame which does not rotate with the rotor 6 and/or at the rotor 6. During external cleaning, the cleaning agent is primarily applied to the external surface of the molds 5, but also to inner surfaces of the molds 5 and to opening edges of the multipart molds 5 which, for this, are opened and closed in a controlled manner, as shown in FIGS. 1 and 2, so that all surfaces of the molds 5 are reliably treated with the respective cleaning medium. During internal cleaning, the molds 5 are closed, as shown in FIG. 3. For example, the cleaning medium is applied by inner nozzles and/or by the plungers 9 which, with the rotary motion of the rotor 6, are moved up and down in a controlled manner.

At least from the closed molds 5, the cleaning medium is drained via the lines 15 into the ring bowl 14 serving as a collection container or catch tank. Basic suitable cleaning media are liquid media, especially foaming media wherein, during the cleaning cycle, different cleaning agents can also be used sequentially.

After the cleaning cycle, external disinfection takes place and then internal disinfection of the molding and filling stations 4 with at least one suitable disinfecting agent which, during external disinfection, is applied in turn via outer rotating and/or fixed nozzles onto the external and internal surfaces of the molding and filling stations or the periodically opened and closed molds 5 and onto the edges of the molds 5, said edges being exposed when the molds 5 are open, and during internal sterilisation of the closed molds 5 via internal nozzles and/or via the plungers 9 which, with the rotor 6 rotating, are in turn moved up and down in a controlled manner. In turn, the disinfecting agent is drained from the molds 5 via the lines 15 into the ring bowl 14.

For example, a suitable liquid medium is used as a disinfecting agent. In principle, there is also the possibility that, during the disinfection cycle, several different media are used sequentially.

During the cleaning cycle and/or during the disinfection cycle, for example simultaneously, the cleaning and disinfection of such ducts, lines and/or functional elements also takes place which, during the normal molding and filling operation, come into contact with the filling material. In principle, there is the possibility of cleaning and sterilising these ducts, lines and functional elements in a CIP method, using rinsing caps 18 which, during this CIP cleaning and sterilisation, for example instead of the preforms 3, are then supplied via the transport star 16 to the individual molding and filling stations which correspond to the shape of the preforms 3 and, during CIP cleaning and CIP disinfection, are arranged with their open end in the sealing position against the respective bearing head 8, so that the utilised cleaning medium or disinfection medium for example after flowing through the ducts and lines etc. to be cleaned or disinfected, enters via the respective plunger 9 into the closed inside of the rinsing cap 18 and is drained via a return gas duct 19 formed in each bearing head 8. If, during this CIP cleaning and CIP disinfection, the plungers 9 are in their raised state and, with the rotor 6 rotating, perform no axial movement, the rinsing caps 18, which enclose or receive the respective plunger 9, also correspond in terms of their size to the preforms 3, so that, instead of the rinsing caps 18 e.g. made of a metallic material and/or of plastic, preforms 3 could be used which are not conditioned or not preheated.

If the plungers 9 perform, during CIP cleaning and CIP disinfection, with the rotor 6 rotating, their axial movement, the rinsing caps 18 have a greater axial length which enables the maximum stroke of the respective plunger 9 from its raised starting position to its lowest position.

Above, it was assumed that the molds 5 are self-emptying via the lines 15 connected to the ring bowl 14, i.e. the respective cleaning agent and/or disinfecting agent drains, due to gravity, via the lines into the ring bowl 14. However, in principle, there is also the possibility of actively emptying the molds 5, for example by applying a negative pressure or suction effect, via the ring bowl 14, to the lines 15, for example by a pump connected to an outlet of the ring bowl 14.

The molds 5, for example, are provided with relief openings which, in the closed condition of the molds 5 and especially during the molding and filling process, are used as pressure relief and/or as drainage openings and/or as control openings and to which, for example, the lines 15 are connected.

Above, it was assumed that rinsing caps 18 are used for CIP cleaning and CIP disinfection. However, in principle, there is also the possibility that the respective tightly sealed mold 5 takes over the function of a rinsing cap, i.e. the inside of each mold 5 is part of the closed CIP cleaning circuit and/or of the closed CIP disinfections circuit. In this design, in particular, the relief openings at the molds 5 are of a closable design.

Above, it was assumed that the cleaning agent or disinfecting agent flows through lines and ducts which carry the filling material during the molding and filling operation in the course of CIP cleaning and/or CIP disinfection, in the filling material direction, i.e. in a flow direction in which the filling material also flows through these lines and ducts during the molding and filling operation. A flow through these lines and ducts against the filling material direction during CIP cleaning and/or CIP disinfection is also possible.

Preferably, during the molding and filling operation, individual molding and filling stations 4 are removed in case of missing and/or faulty and/or damaged preforms 3 and/or containers 2 and/or in case of errors in the molding and filling process. For example, this removal is controlled by suitable sensors in and/or at the molding and filling station or in and/or at the molds 5 and/or the molding and filling elements 7 and/or at the path of motion of the filled containers 2, for example at the transport star 17, and/or through signal exchange with other functional units of the system comprising the device 1 etc. In particular, it is thus possible to perform the cleaning and disinfection operation periodically, e.g. by way of time control and/or performance control, i.e. always depending on a certain number of formed and filled containers 2 without microbiological hazard risk.

As an alternative to the rinsing caps 18, caps or rinsing bodies approximated to the shape of the containers 2 can also be used, said caps or rinsing bodies having, externally, a plurality of nozzle openings through which the cleaning agent and/or disinfecting agent is applied during internal cleaning and/or internal disinfection, for example, during CIP cleaning and/or disinfection, also onto the inner surfaces of the respective mold 5.

Preferably after completion of cleaning and/or disinfection, preferably at the end of the cleaning and disinfection operation, at least the inner surfaces of the respective mold 5 are blown out with a sterile gaseous and/or vaporous medium, for example with sterile air.

Figure 7:
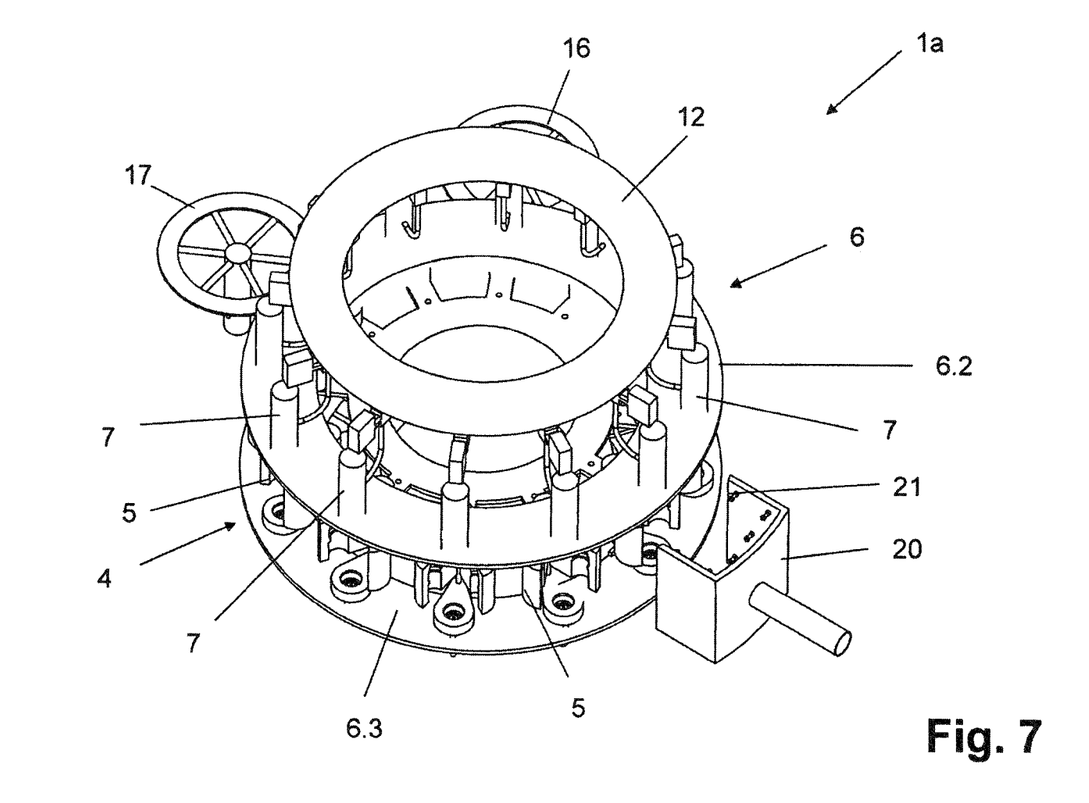
FIG. 7 showing, in a perspective representation similar to FIG. 1, a further embodiment of the device according to the invention.
Figure 8:
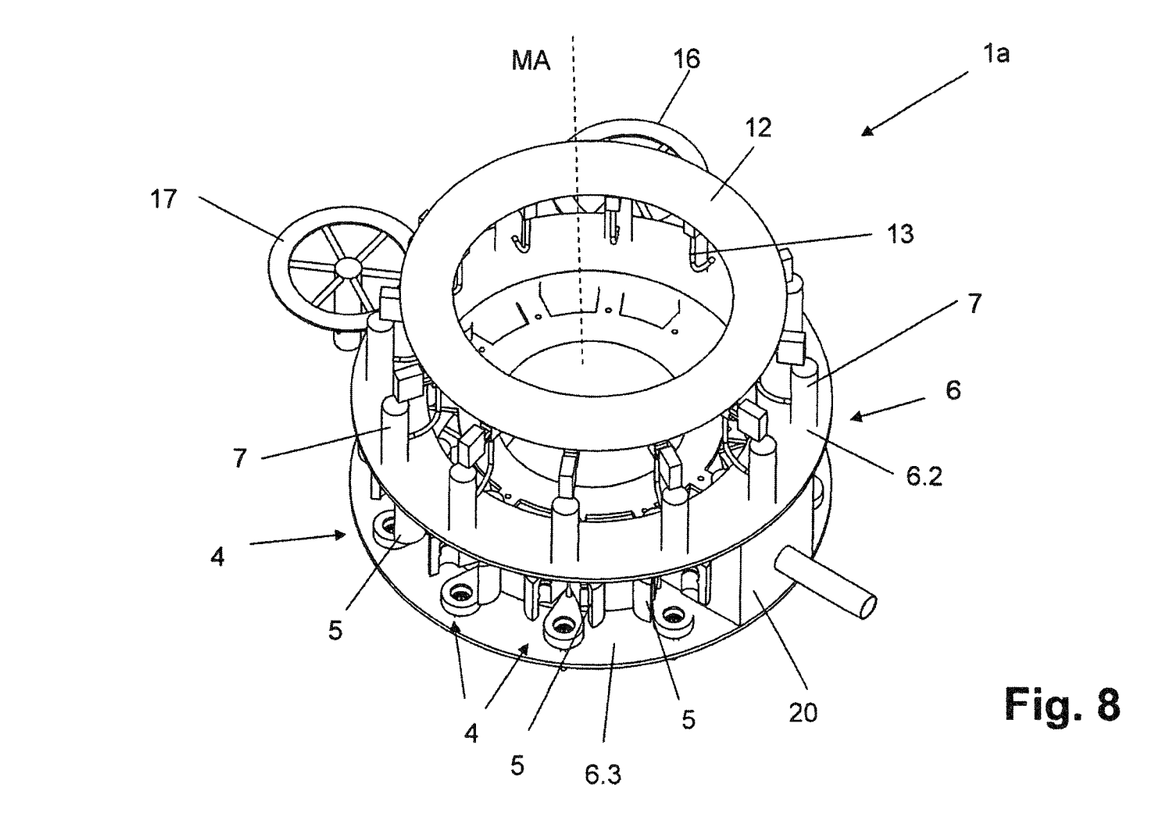
FIG. 8 showing a representation like FIG. 6, but with a cleaning hood in an operating position.
Figure 9:
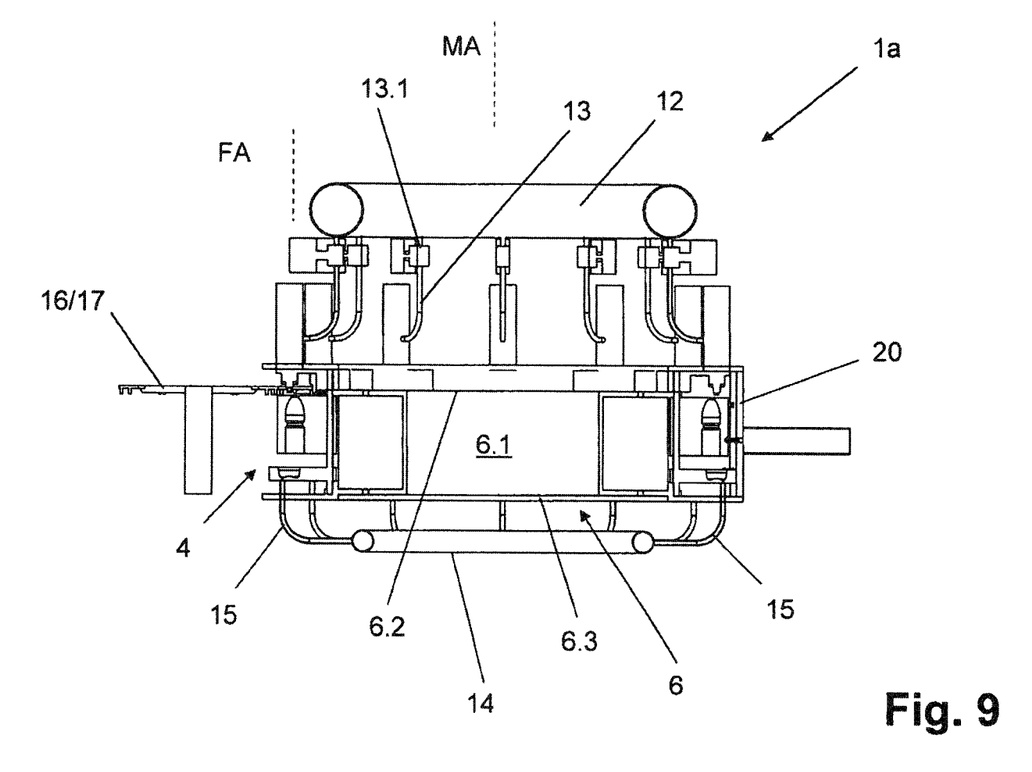
FIG. 9 showing, in simplified representation, a vertical section of the device of FIG. 8 with a cleaning hood in an operating position.

FIGS. 7-9 show, as a further embodiment, a device 1*a* which essentially differs from the device 1 only in that, for external and internal cleaning and for external and internal disinfection of the molds 5, a cleaning and/or disinfection hood 20 is provided which, interacting with the rotor 6 or with the rotor portions 1.6-6.3, forms an internal space which receives the respective mold 5 during cleaning and/or disinfection and which is outwardly closed or essentially closed.

The hood 20, in respect of the machine axis MA, is intended to be radially movable or adjustable, namely from the initial position shown in FIG. 7 to the working position shown in FIGS. 8 and 9, in which the hood 20 forms the closed space. At the inner surface of the hood 20, a plurality of nozzles 21 are provided for applying the cleaning agent and/or the disinfecting agent. During the cleaning cycle and/or disinfection cycle, the rotor 6 is always cycled further by the mutual spacing of two molding and filling stations 4, wherein, in each standstill phase of this cycled motion, the hood 20 moves from the initial position to the working position, then the external and internal cleaning and/or disinfection of the mold 5 concerned are performed and the hood 20 is then moved back to its initial position. During this cleaning and/or disinfection, the mold 5 received in the hood 20 is preferably opened and closed once or many times, in a controlled manner. Otherwise, the device 1a corresponds, especially as regards the further process steps of the cleaning and disinfection operation, to the device 1.

The invention was described above using exemplary embodiments. It is understood that numerous changes and modifications are possible without departing from the inventive idea underlying the invention.

LIST OF REFERENCE SYMBOLS 1, 1a device
2 container
3 preform
4 molding and filing station
5 mold
6 rotor
6.1-6.3 rotor portion
7 molding and filling elements
8 bearing head
9 plunger
10 fluid duct
11 opening
12 ring bowl
13 line
13.1 control valve
14 ring bowl
15 line
16, 17 transport star
18 rinsing cap
19 return gas duct
20 hood
21 nozzle
FA vertical axis of the molding and filling element 7
MA vertical machine axis

We claim:

1. A method for cleaning and/or disinfecting at least an openable and closeable multipart mold of a molding and filling station of a device for producing a container filled with a liquid filling material from a thermally conditioned preform made of a thermoplastic material by stretching the thermally conditioned preform in an axial direction using a plunger and simultaneously molding and filling the thermally conditioned preform in the multipart mold with the liquid filling material supplied under pressure, the method comprising:

carrying out a cleaning and/or disinfection operation of the device by applying at least one cleaning and/or disinfecting agent to the multipart mold when the multipart mold is opened and when the multipart mold is closed such that the cleaning and/or disinfecting agent is applied to external surfaces of the multipart mold and to inner surfaces of the multipart mold and to opening edges of the multipart mold and such that liquid filling material residues are removed from the external surfaces of the multipart mold and the inner surfaces of the multipart mold and the opening edges of the multipart mold by the cleaning and/or disinfecting agent applied thereto; and optionally, applying the cleaning agent and/or disinfecting agent while the plunger is moved at least once between an initial position and an end position such that the liquid filling material residues are removed from the plunger by the cleaning and/or disinfecting agent applied thereto.

2. The method according to claim 1, wherein the device has a plurality of molding and filling stations mounted on a rotatably drivable transport element, wherein each of the plurality of molding and filling stations includes an openable and closable multipart mold and a plunger, and wherein, during the cleaning and/or disinfection operation of the device, the liquid cleaning and/or disinfecting agent is applied to external surfaces, inner surfaces and opening edges of each openable and closable multipart mold of the plurality of molding and filling stations such that the liquid filling material residues are removed from the external surfaces, the inner surfaces and the opening edges thereof.

3. The method according to claim 2, wherein, during the cleaning and/or disinfection operation of the device, the cleaning and/or disinfecting agent is applied to each of the plurality of molding and filling stations in cycles or steps as the transport element is rotated, and wherein the cleaning and/or disinfecting agent is applied at least partially using a cleaning and/or disinfection hood that is adjustable and encloses each of the plurality of molding and filling stations at least partially.

4. The method according to claim 1, further comprising, during the cleaning and/or disinfection operation, installing a rinsing cap to enclose the plunger such that the applied cleaning and/or disinfecting agent flows through ducts and lines of the device.

5. The method according to claim 4, wherein prior to the cleaning and/or disinfection operation the rinsing cap is supplied to the molding and filling station of the device by an infeed and subsequent to the cleaning and/or disinfection operation the rinsing cap is removed from the device by an outfeed, and wherein during normal operation of the device the infeed is configured to supply the thermally conditioned perform to the molding and filling station of the device and the outfeed is configured to remove containers filled with the liquid filling material from the molding and filling station of the device.

6. The method according to claim 1, wherein, during the cleaning and/or disinfection operation, the cleaning and/or disinfecting agent is applied using fixed or rotating nozzles and/or the plunger is provided with at least one opening for applying the cleaning and/or disinfecting agent to the inside of the multipart mold.

7. The method according to claim 1, further comprising draining the cleaning and/or disinfecting agent from the closed multipart mold via at least one switchable or controllable drainage duct.

8. The method according to claim 1, further comprising, during the cleaning and/or disinfection operation, making a connection between a cleaning and/or disinfecting agent infeed and a cleaning and/or disinfecting agent return or drain for internal cleaning and/or internal sterilization of the device.

9. The method according to claim 1, further comprising, during the cleaning and/or disinfection operation, installing a rinsing cap provided with at least one spraying nozzle or nozzle opening to at least partially enclose the plunger such that internal cleaning and/or internal sterilization of the multipart mold is performed.

10. The method according to claim 1, wherein at least one parting line of the multipart mold is used for draining the cleaning and/or disinfecting agent as part of the cleaning and/or disinfection operation.

11. The method according to claim 1, further comprising, after completion of the cleaning and/or disinfection operation, blowing at least the inside of the multipart mold with a sterile gaseous and/or vaporous medium.

12. The method according to claim 1, further comprising initiating the cleaning and/or disinfection operation based on signals received from a sensor indicating that errors have occurred during normal operation of the device.

\* \* \* \* \*